United States Patent
Watanabe et al.

(10) Patent No.: US 8,997,168 B2
(45) Date of Patent: Mar. 31, 2015

(54) VIDEO SERVER APPARATUS AND SYNCHRONIZATION CONTROL METHOD

(75) Inventors: Hiroyuki Watanabe, Koganei (JP); Toshiki Mori, Kodaira (JP); Shuichi Yamaguchi, Kawasaki (JP); Naoko Satoh, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 181 days.

(21) Appl. No.: 13/362,301

(22) Filed: Jan. 31, 2012

(65) Prior Publication Data

US 2012/0240179 A1 Sep. 20, 2012

(30) Foreign Application Priority Data

Mar. 17, 2011 (JP) ................................. 2011-059920
Dec. 26, 2011 (JP) ................................. 2011-284232

(51) Int. Cl.
*H04N 7/16* (2011.01)
*H04N 21/2743* (2011.01)
*H04N 21/482* (2011.01)
*G06F 17/30* (2006.01)

(52) U.S. Cl.
CPC ....... *H04N 21/2743* (2013.01); *H04N 21/4828* (2013.01); *G06F 17/30858* (2013.01)
USPC ............... 725/145; 725/25; 725/37; 725/100; 725/111; 725/122; 725/131

(58) Field of Classification Search
USPC .............. 725/25, 37, 100, 111, 122, 131, 145
See application file for complete search history.

(56) References Cited

U.S. PATENT DOCUMENTS

| 7,023,924 B1* | 4/2006 | Keller et al. ............. 375/240.26 |
| 2003/0103766 A1* | 6/2003 | Sugahara et al. ................ 386/96 |
| 2004/0186877 A1 | 9/2004 | Wang et al. |
| 2010/0061696 A1 | 3/2010 | Aoki |

FOREIGN PATENT DOCUMENTS

| JP | 08-255142 | 10/1996 |
| JP | 2006-521035 | 9/2006 |
| JP | 2006-332839 A | 12/2006 |
| KR | 10-2010-0030574 A | 3/2010 |

OTHER PUBLICATIONS

Nobuyuki Kato, "Flush Memory Video Server for Broadcasting Material of Network and Tapeless Media, Videos neo TM," Toshiba review, Sep., [online], Sep. 2010, vol. 65 No. 9, p. 40-43, [retrieved on Jan. 15, 2013], Internet <URL:http://www.toshiba.co.jp/tech/review/2010/09/65_09pdf/f04.pdf>.

(Continued)

*Primary Examiner* — Jivka Rabovianski

(74) *Attorney, Agent, or Firm* — Knobbe, Martens, Olson & Bear LLP

(57) ABSTRACT

According to one embodiment, a video server apparatus includes a memory, a recorder, a decoder, a controller, a synchronizer, a sync signal transmitter and a time manager. The synchronizer generates sync signals in frame unit. The sync signal transmitter distributes the sync signals generated by the synchronizer in frame unit, to the memory, the recorder, the decoder and the controller. Each of the memory, recorder, decoder and controller includes a time manager. The time manager manages the sync signals distributed.

11 Claims, 8 Drawing Sheets

(56) References Cited

OTHER PUBLICATIONS

Japanese Office Action for corresponding Japanese Application No. 2011-284232, mailed Jan. 22, 2013, in 5 pages.

Office Action mailed by Korean Patent Office on Mar. 25, 2013 in the corresponding to Korean patent application No. 10-2012-9114 in 13 pages.

Background Art Information Sheet with Concise Explanation of Japanese reference No. 08-255142, undated in 1 page.

* cited by examiner

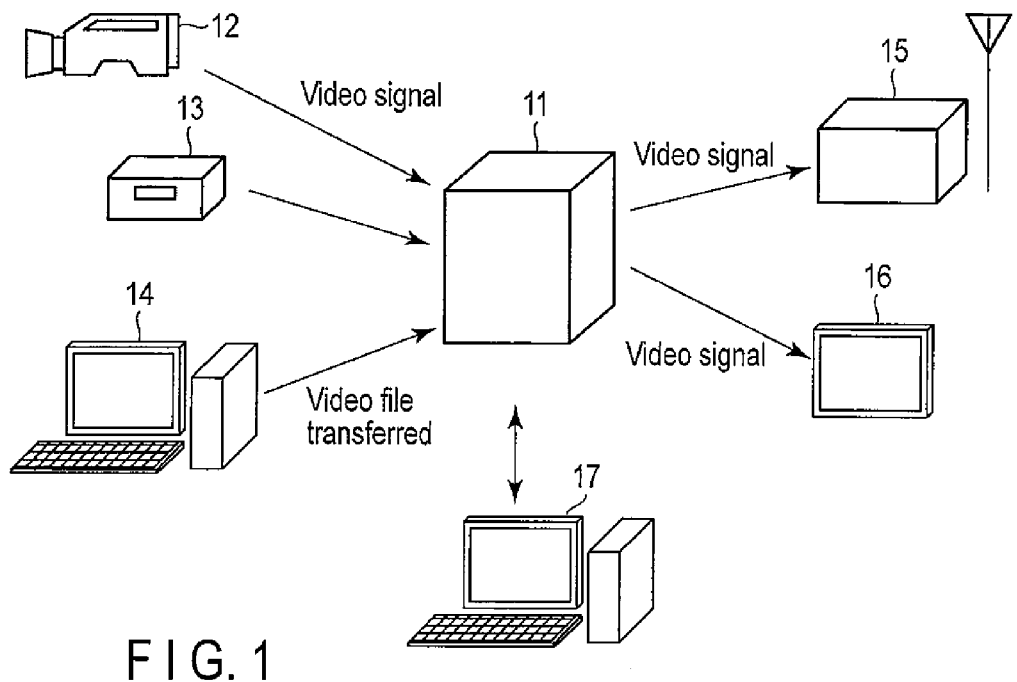
F I G. 1
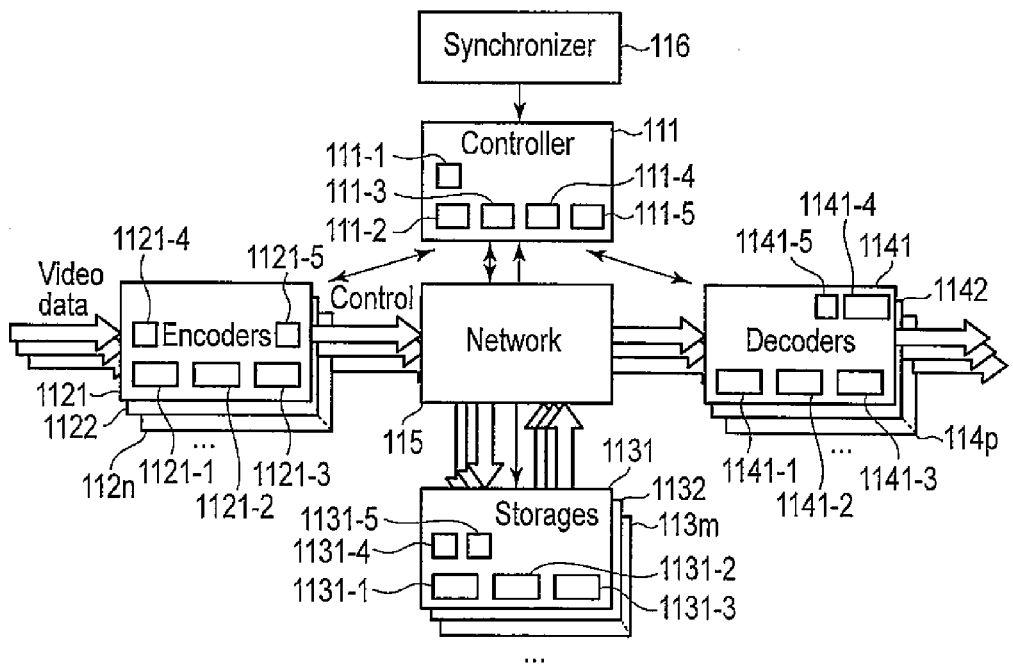
F I G. 2

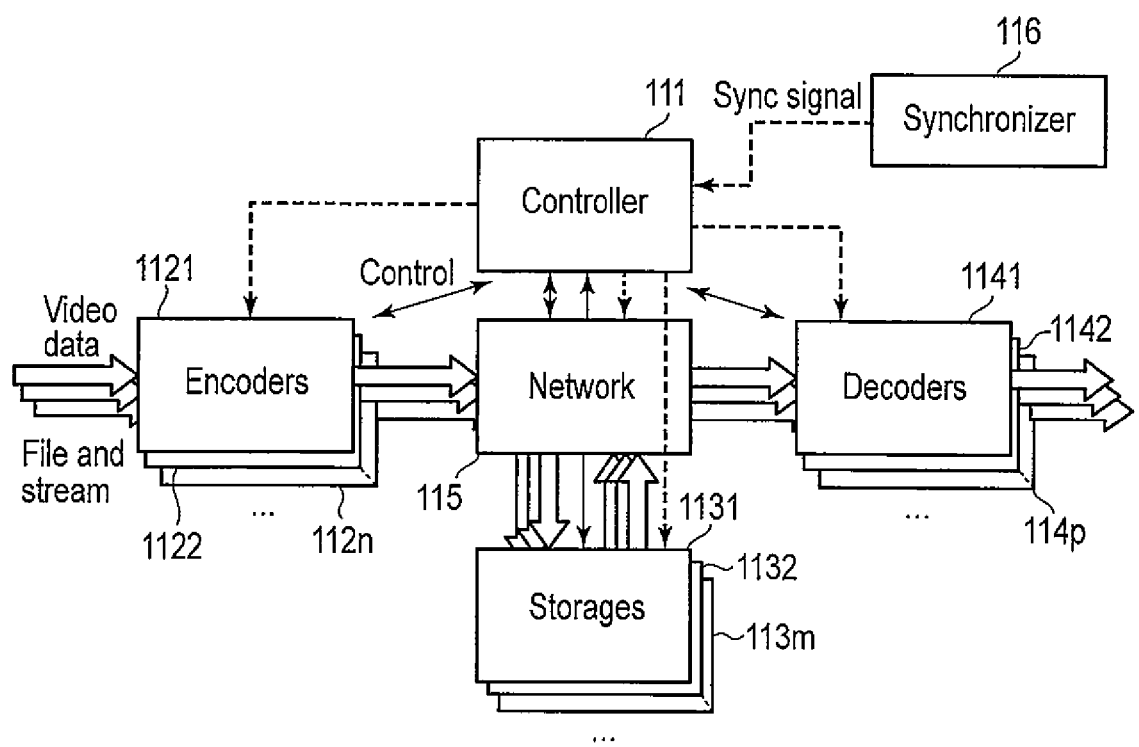
F I G. 3

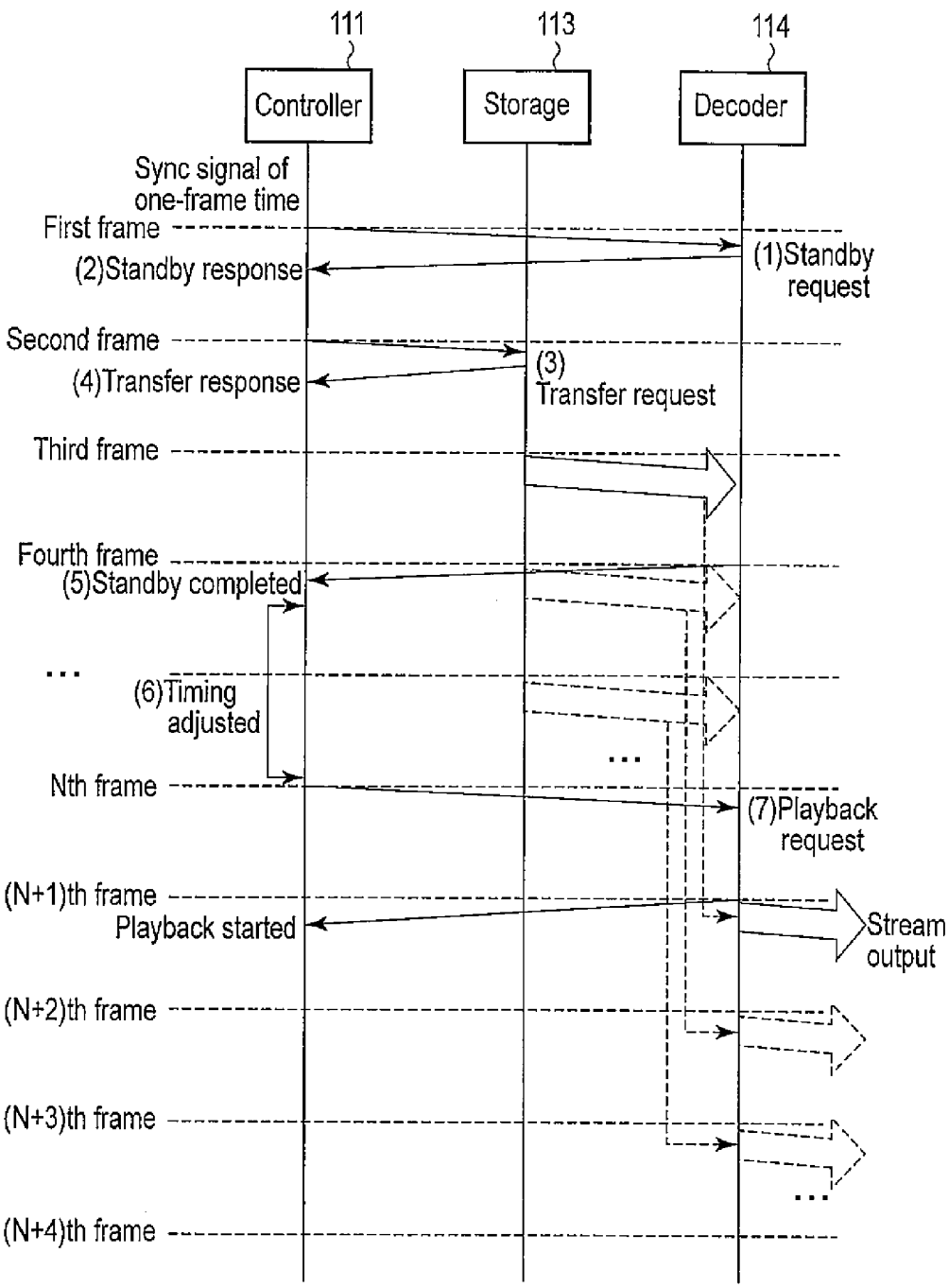
F I G. 6

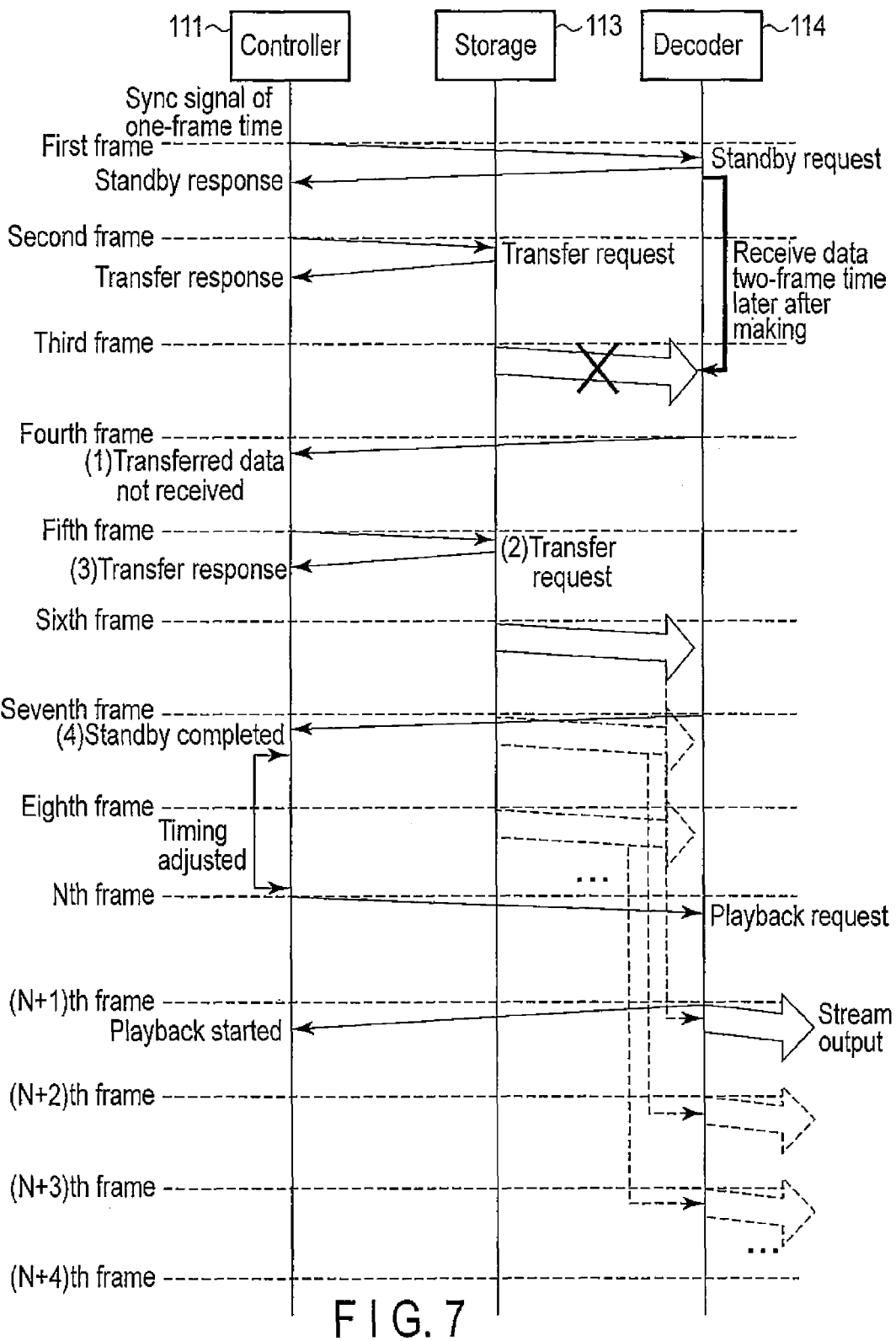
F I G. 7

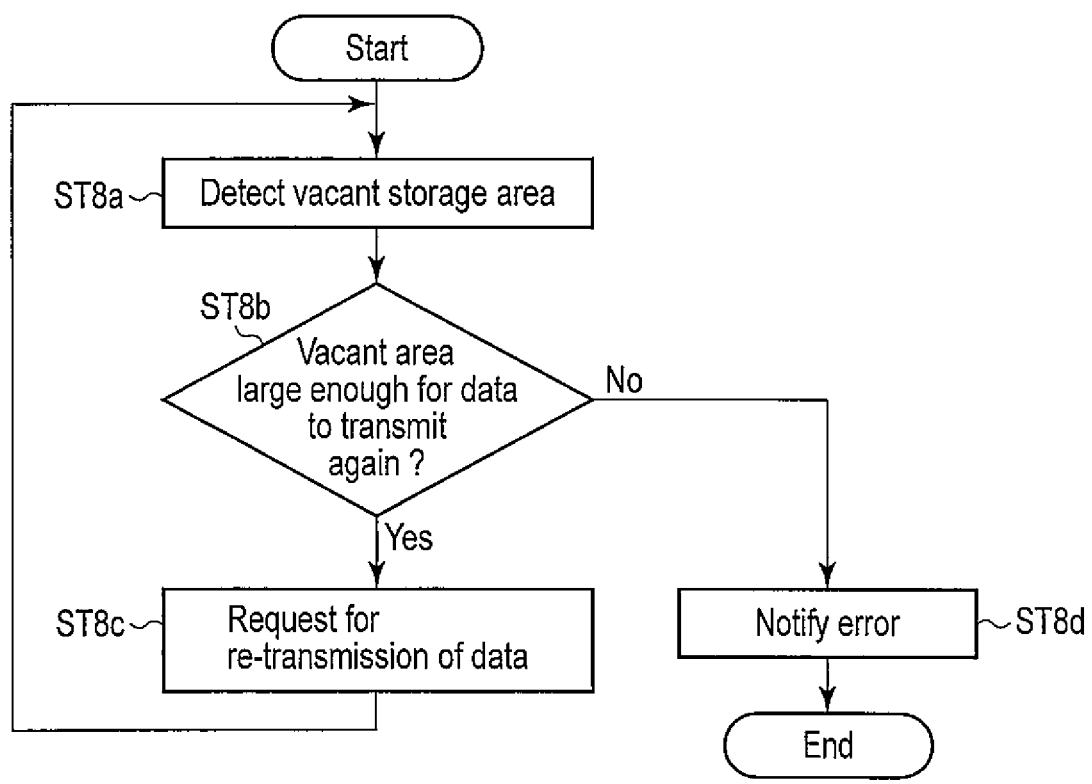
F I G. 8

VIDEO SERVER APPARATUS AND SYNCHRONIZATION CONTROL METHOD

CROSS-REFERENCE TO RELATED APPLICATIONS

This application is based upon and claims the benefit of priority from prior Japanese Patent Applications No. 2011-059920, filed Mar. 17, 2011; and No. 2011-284232, filed Dec. 26, 2011, the entire contents of all of which are incorporated herein by reference.

FIELD

Embodiments described herein relate generally to a video server apparatus configured to perform, in a broadcasting station, a process of transmitting broadcast content data, and also to a synchronization control method for use in the video server apparatus.

BACKGROUND

As is known, any broadcast program transmitting system stores the broadcast content data in a video server apparatus, plays back in accordance with the instructions coming from an automatic program control apparatus (APC) and executes an on-air. Before the programs are broadcast from the broadcasting station. In such an on-air process, the programs are usually confirmed in accordance with the on-air sequence.

The image quality has greatly increased, from high-vision level (3K×1K) to full high-vision level (4K×2K), and hence to super high-vision level (8K×4K). In addition, the broadcast content data has increased in volume, from the terrestrial broadcast level to the broadcasting satellite (BS) level and hence to the communication satellite (CS) level, and are broadcast in ever increasing channels. In order to store these content data, the video server required having a very large storage capacity and must distribute the programs to many channels. Therefore, the video server should have high data processing ability and should include not a single function, but a plurality of function modules that perform different functions.

In such an apparatus including a plurality of function modules, the function modules required that connecting to a high-speed bus, thereby transmitting and receiving a great amount of data. Particularly, video data should be transmitted and received, in real time of frame level. The high-speed bus used to transmit and receive data between substrates in a great amount is not a synchronous bus, but a versatile, high-speed asynchronous bus, in some cases.

In the multi-CPU configuration described above, the CPUs required playing back data within a predetermined time, in synchronism with control of frame units. Hence, a video server can ensure the quality of images played back if the video server has any means for synchronization among the CPUs. Timers may be used to make the CPUs operate in unison. In this case, however, a method of making synchronizing the timers must be performed. This will render the inter-CPU process complicated. High-precision timers may be incorporated in the processor, respectively, and the CPUs may refer to the time any timer measures. The use of high-precision timers, however, will raise the apparatus cost.

Even if timers are provided for the CPUs, respectively, and are synchronized at high precision, any video data played back will not improve in quality unless means for detecting failures in one-frame control is used to recover the failure in, for GOP. Without a means for notifying that failures that cannot be recovered, the switching to any redundancy system cannot be achieved. It is difficult to provide a video data playback apparatus capable of ensuring the quality of the images played back.

BRIEF DESCRIPTION OF THE DRAWINGS

FIG. 1 is a block diagram showing the configuration of a broadcast program transmitting system to which an embodiment is applied;

FIG. 2 is a circuit block diagram showing the configuration of a video server according the embodiment;

FIG. 3 is a diagram showing a method of distributing sync signals;

FIG. 6 is a diagram showing the playback control sequence performed in the embodiment that remains in normal conditions;

FIG. 7 is a diagram showing the playback control sequence performed in the embodiment when any failure occurs;

FIG. 8 is a flowchart showing the control sequence performed in the decoder of the embodiment.

DETAILED DESCRIPTION

Figure 4A:
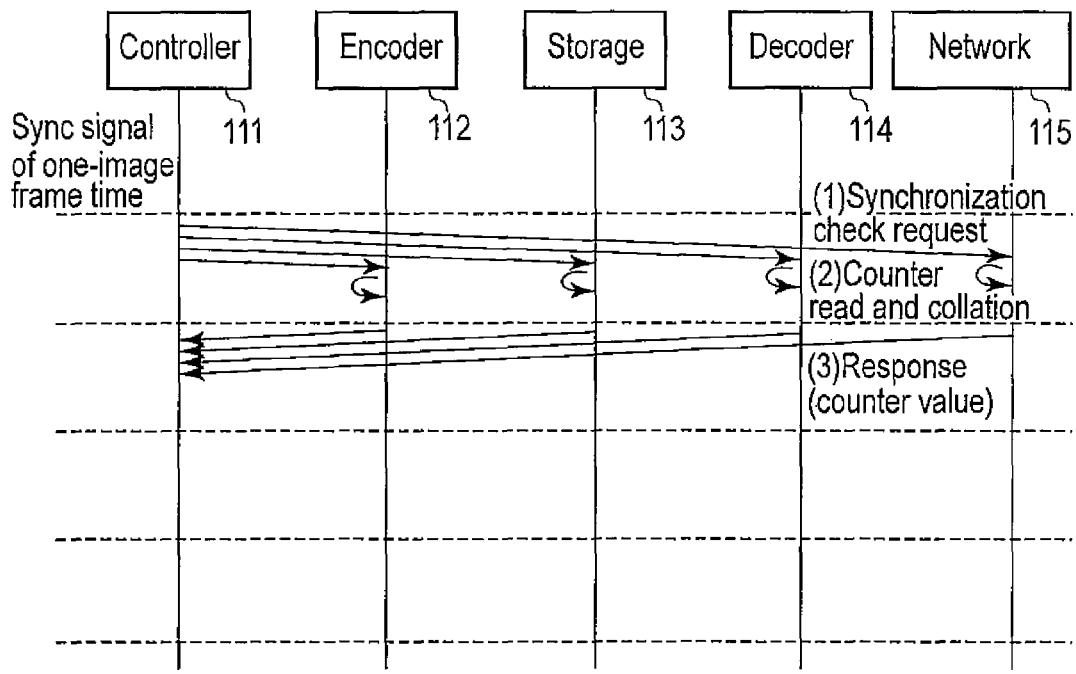
FIG. 4A is a diagram showing a method of reading sync signal data, in units of one-image frame time, in the embodiment.

Hereinafter, referring the accompanying drawings, an embodiment will be explained in detail.

In general, according to one embodiment, a video server apparatus includes a memory, a recorder, a decoder, a controller, a synchronizer and a sync signal transmitter. The memory includes a first timer and records content data based on the time measured by the first timer. The recorder includes a second timer and records the content data in the memory based on the time measured by the second timer. The decoder includes a third timer and playbacks the content data recorded in the recorder based on the time measured by the third timer. The controller controls all processes performed in the memory, the recorder and the decoder, respectively. The synchronizer generates sync signals in frame unit. The sync signal transmitter distributes the sync signals generated by the synchronizer in frame unit, to the memory, the recorder, the decoder and the controller. Each of the memory, recorder, decoder and controller includes a time manager. The time manager manages the sync signals distributed by the sync signal transmitter.

FIG. 1 is a block diagram showing the configuration of a broadcast program transmitting system to which an embodiment is applied. In FIG. 1, number 11 designates a video server 11. The video server 11 stores content data for on-air (hereinafter called "video data") supplied from a camera 12, a playback deck 13 and a nonlinear editor 14. The video server 11 selects and plays back video data in accordance with an on-air instruction. The video server 11 decodes the video data, generating a video signal. The video signal is supplied to a broadcasting apparatus 15. The broadcasting apparatus 15 transmits the video signal. The video signal played back is supplied from the video server 11 to a monitor 16.

The video server 11 performs a video data read/write control in accordance with the instruction input at a console terminal 17.

FIG. 2 is a circuit block diagram showing the configuration of the video server 11 according the embodiment.

The video server 11 includes a controller 111, encoders 1121 to 112n, storages 1131 to 113m, decoders 1141 to 114p, and a network 115. The controller 111 controls the other components of the video server 11. The encoders 1121 to 112n perform a recording process such as encoding video signals transmitted from cameras or video decks. The storages 1131 to 113m perform read/write processes of reading video data acquired at the encoders 1121 to 112n, reading or writing the video data from and to recording media such as flash memories. The decoders 1141 to 114p execute playback process such as decoding the video data read from the storages 1131 to 113m to video signals, and output the video signals. The network 115 is used an asynchronous bus designed to transfer video data at high speed. The network 115 also switches the input channels connecting the storages 1131 to 113m and the output channels connecting the decoders 1141 to 114p.

In response to a control signal, the controller 111 instructs the encoders 1121 to 112n to acquire video data in order to record the video data. The encoders 1121 to 112n received instruction encode the video data, generating an MPEG2 video signal by encoding the video data. At the same time the controller 111 instructs the encoders 1121 to 112n, the controller 111 instructs the storages 1131 to 113m to write the video data. Then, the storages 1131 to 113m write the video data to the recording media. In order to play back the video data, the controller 111 instructs the storages 1131 to 113m to read the video data. At the same time the controller 111 instructs the storages 1131 to 113m, the controller 111 instructs the decoders 1141 to 114p to decode the video data. The decoders 1141 to 114p received instruction decode the video data, generating decoded video signal such as MPEG2, and outputs the video signal.

In the network 115 used an asynchronous bus, the video data supplied from the encoders 1121 to 112n and the video data supplied from the storages 1131 to 113m are accumulated. Consequently, the packets may collide in the network 115, discarding some packets and causing a temporal delay.

A synchronizer 116 generates a frame sync signal such as 60/1.001 Hz for synchronizing video data.

The controller 111 includes a timer 111-1, a sync signal transmitter 111-2, a decision function 111-3, a recovery controller 111-4, and a log data manager 111-5. The timer 111-1 measures a process time.

The sync signal transmitter 111-2 receives sync signals supplied from the synchronizer 116, in frame unit, manages these sync signals and distributes the sync signals to the storages 1131 to 113m and decoders 1141 to 114p. The sync signal transmitter 111-2 further adjusts the process time (counter value) measured by the timer 111-1 to the sync signal, if necessary.

The decision function 111-3 determines whether the encoders 1121 to 112n, storages 1131 to 113m and decoders 1141 to 114p are synchronized with one another, while the encoders 1121 to 112n, storages 1131 to 113m and decoders 1141 to 114p are adjusted to synchronize with one another. If the encoders 1121 to 112n, storages 1131 to 113m and decoders 1141 to 114p are not synchronized, the decision function 111-3 determines whether the data can be recovered or not through a playback process, based on the synchronization error amount. To determine this condition, the decision function 111-3 uses not only the synchronization error amount with respect to the encoders 1121 to 112n, storages 1131 to 113m and decoders 1141 to 114p, but also the vacant storage areas of the buffers 1121-1, 1131-1 and 1141-1 provided in the encoders 1121 to 112n, storages 1131 to 113m and decoders 1141 to 114p, respectively. Note that these buffers 1121-1, 1131-1 and 1141-1 temporarily accumulate the video data to be processed. For example, it is determined whether the buffer 1121-1 can store video data for two frames. If the vacant storage areas of the buffer 1121-1 can store two-frame video data, the decision function 111-3 determines that the data can be recovered. If the buffer 1121-1 cannot store two-frame video data, the decision function 111-3 determines that the data cannot be recovered.

If the decision function 111-3 determines that the data can be recovered, the recovery controller 111-4 performs a process to recover the next frame of the video data.

The log data manager 111-5 manages the controls performed on frame unit, as log data, in respect to each event.

Each of the encoders 1121 to 112n has a timer 1121-2, a sync signal manager 1121-3, a log data management module 1121-4, and a decision function 1121-5. Each of the storages 1131 to 113m has a timer 1131-2, a sync signal manager 1131-3, a log data manager 1131-4, and a decision function 2231-5. Further, each of the decoders 1141 to 114p has a timer 1141-2, a sync signal manager 1141-3, a log data manager 1141-4, and a decision function 1141-5. Only the storage 1131 of the storages 1131 to 113m will be described herein, as a representative.

In the storage 1131, the sync signal manager 1131-3 manages sync signals transmitted from the controller 111. The sync signal manager 1131-3 also adjusts, if necessary, the process time (counter value) measured by the timer 1131-1, to the sync signal. The log data manager 1131-4 manages the controls performed on frame unit, as log data, in respect to each event.

The decision function 1131-5 determines whether the encoders 1121 to 112n, storages 1131 to 113m and decoders 1141 to 114p are synchronized with one another, while the encoders 1121 to 112n, storages 1131 to 113m and decoders 1141 to 114p are adjusted to synchronize with one another. If the encoders 1121 to 112n, storages 1131 to 113m and decoders 1141 to 114p are not synchronized, the decision function 1131-5 determines whether the data can be recovered or not in the playback process, based on the synchronization error amount. To determine this condition, the decision function 1131-5 uses not only the synchronization error amount with respect to the encoders 1121 to 112n and the encoders 1141 to 114p, but also the vacant storage areas of the buffer 1131-1. For example, it is determined whether video data for 2 frames can be stored in the buffer 1131-1. If the buffer 1131-1 is found to have a vacant area for holding two-frame video data, it is determined that the data can be recovered. If the two-frame video data cannot be stored, it is determined that the data cannot be recovered.

How the configuration described above operates will be explained below.

(Method of Distributing the Sync Signals)

FIG. 3 is a diagram showing a method of distributing sync signals.

To play back programs in high quality, the video server apparatus must operate in synchronism with the sync signals the synchronizer 116 supplies in frame unit. The controller 111 transmits the sync signals in frame unit from the synchronizer 116 to the encoders 1121 to 112n, storages 1131 to 113m, decoders 1141 to 114p and network 115. The sync signals may be supplied to these functions not via the controller 111, but via another function. Alternatively, the sync signals may be supplied from the synchronizer 116, directly to the encoders 1121 to 112n, storages 1131 to 113m, decoders 1141 to 114p and network 115.

(Method of Reading Sync Signal Data)

FIG. 4 is a diagram showing a method of reading sync signal data, in frame unit, in the embodiment.

First, the controller 111 transmits a synchronization check request to the encoders 1121 to 112n, storages 1131 to 113m, decoders 1141 to 114p and network 115 (FIG. 4 (1)). The synchronization check request is request for confirming to synchronize with one another.

In response to the synchronization check request transmitted from the controller 111, the encoders 1121 to 112n, storages 1131 to 113m, decoders 1141 to 114p and network 115, read and check the counter values generated in the timers 1121-1, 2231-2 and 1141-2 (FIG. 4 (2)).

The encoders 1121 to 112n, storages 1131 to 113m, decoders 1141 to 114p and network 115 notify the counter values to the controller 111, in synchronism with the frame unit (FIG. 4 (3)). If the counter values of the frame unit for the encoders 1121 to 112n, storages 1131 to 113m, decoders 1141 to 114p and network 115 are correct, the counter values notified to the controller 111 are identical to all counter values held in the controller 111. The controller 111 may select whether inquire to the encoders 1121 to 112n, storages 1131 to 113m, decoders 1141 to 114p and network 115 within frame unit.

The counter values may not be notified in next frame unit of the inquiring, from the encoders 1121 to 112n, storages 1131 to 113m, decoders 1141 to 114p and network 115 to the controller 111. The method of notifying the counter values is optional. In the method of FIG. 4, the controller 111 makes inquiry to the encoders 1121 to 112n, storages 1131 to 113m, decoders 1141 to 114p and network 115. Instead, the encoders 1121 to 112n, storages 1131 to 113m, decoders 1141 to 114p and network 115 may periodically notify the counter values to the controller 111.

Figure 4B:
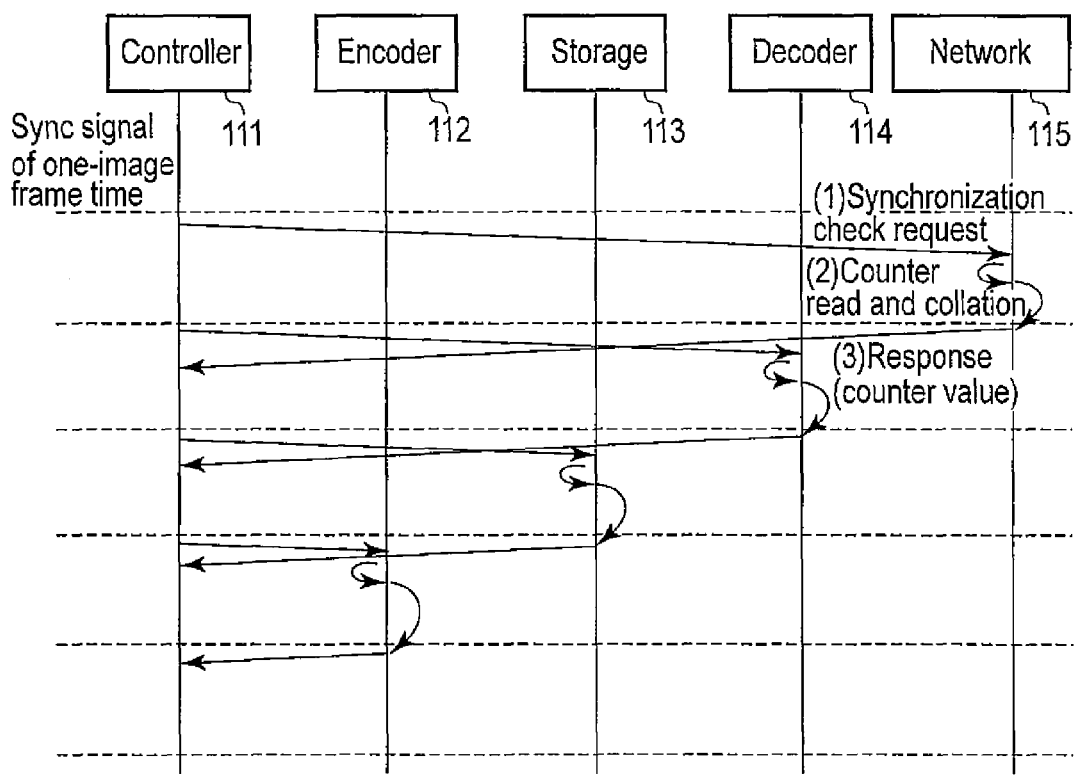
FIG. 4B is a diagram showing a method of reading sync signal data, in modules of one-image frame time, in the embodiment.

FIG. 4A shows the case where the controller 111 transmits a synchronization check request to the encoders 1121 to 112n, storages 1131 to 113m, decoders 1141 to 114p and network 115 at the same time. FIG. 4B shows the case where the controller 111 transmits a synchronization check request to the encoders 1121 to 112n, storages 1131 to 113m, decoders 1141 to 114p and network 115, one after another in a specific order.

(Method of Setting Sync Signals)

Figure 5A:
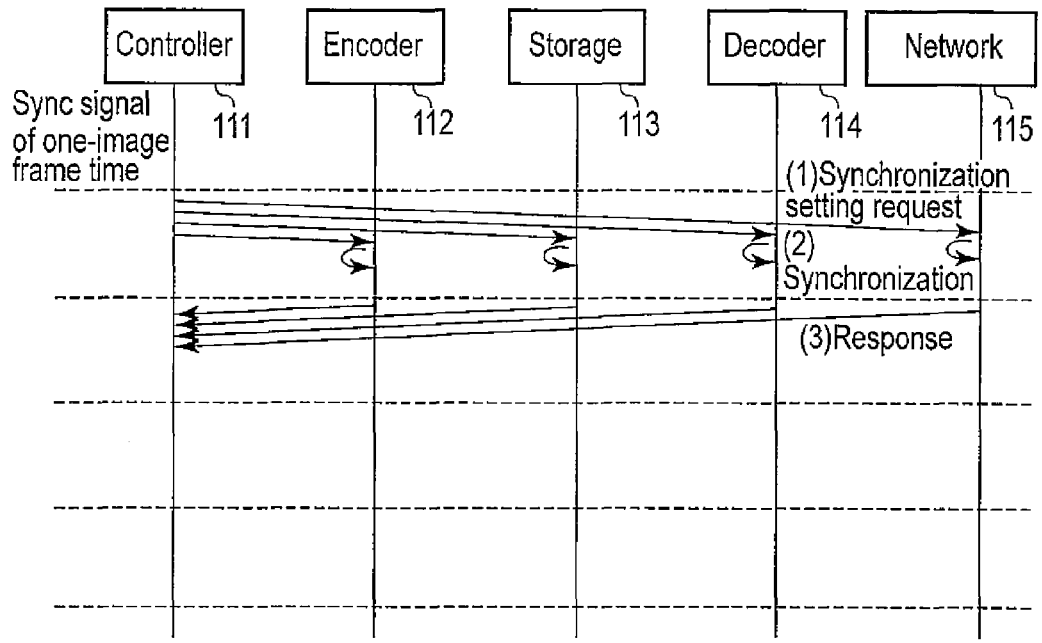
FIG. 5A is a diagram showing a method of setting sync signals, in units of one-image frame time, in the embodiment.
Figure 5B:
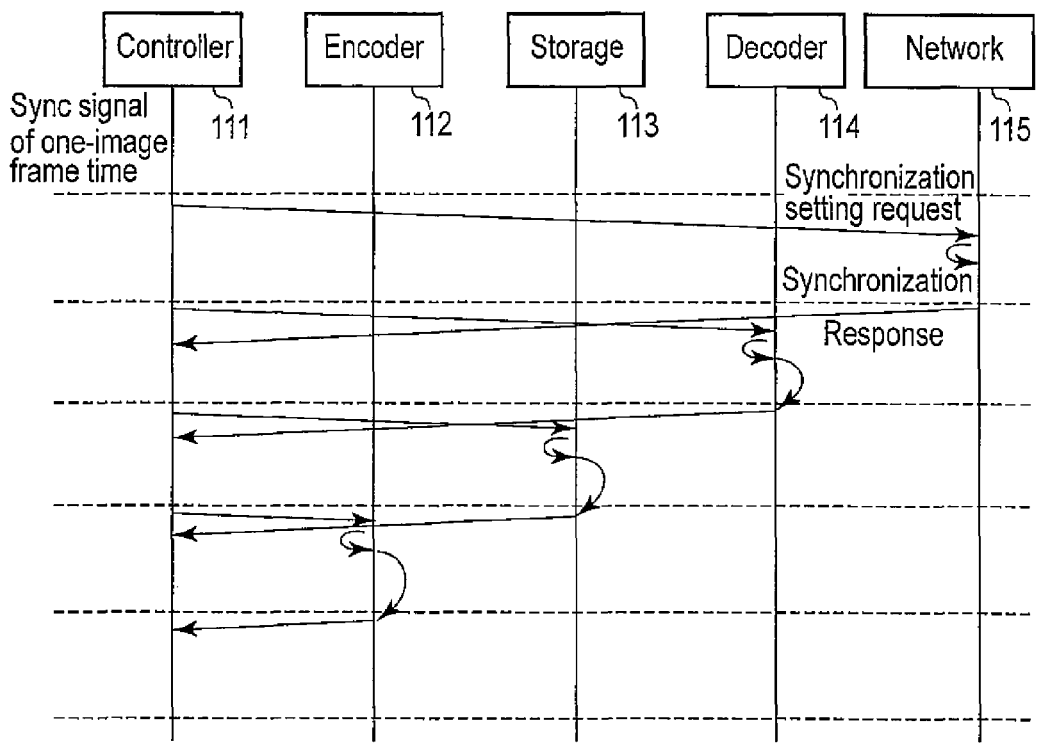
FIG. 5B is a diagram showing a method of setting sync signals, in units of one-image frame time, in the embodiment.

FIG. 5A and FIG. 5B are a diagram showing a method of setting sync signals, in frame unit, in the present embodiment.

In the synchronization check, the counter values may be found not identical, in frame unit, with the counter values held in the controller 111. In this case, the controller 111 periodically transmits a request for synchronization setting, to the encoders 1121 to 112n, storages 1131 to 113m, decoders 1141 to 114p and network 115 (FIG. 5 (1)).

In response to the request for synchronization setting, the encoders 1121 to 112n, storages 1131 to 113m, decoders 1141 to 114p and network 115 set the counter values in frame unit, with the counter values held in the controller 111 (FIG. 5 (2)), and then notify the results of this setting to the controller 111 (FIG. 5 (3)).

The controller 111 can therefore make the counter values in frame unit, at the encoders 1121 to 112n, storages 1131 to 113m, decoders 1141 to 114p and network 115, identical to the counter values designated by the controller 111. Further, whether or not the controller 111 sets the sync signals to the encoders 1121 to 112n, storages 1131 to 113m, decoders 1141 to 114p and network 115, also in the same functions, i.e., frame unit, is optional.

Moreover, the encoders 1121 to 112n, storages 1131 to 113m, decoders 1141 to 114p and network 115 may not notify the counter values to the controller 111, always in next frame unit of the inquiring. Instead, they may notify the counter values at any other timing.

FIG. 5A shows the case where the controller 111 transmits a sync-signal setting request to the encoders 1121 to 112n, storages 1131 to 113m, decoders 1141 to 114p and network 115 at the same time. FIG. 5B shows the case where the controller 111 transmits sync-signal setting request to the encoders 1121 to 112n, storages 1131 to 113m, decoders 1141 to 114p and network 115, one after another in a specific order.

(Playback Control)

FIG. 6 shows the playback control sequence performed in the embodiment that remains in normal conditions. The storages 1131 to 113m will be described as one storage 113, and the decoders 1141 to 114p will be described as one decoder 114.

The controller 111, the storage 113 and the decoder 114 control the playback sequence in synchronism with the units of image frame time. If no video data is available in it, the decoder 114 transits to the state in which it can receive a standby request from the controller 111 and can therefore receive video data.

In this case, the controller 111 transmits a standby request to the decoder 114 (FIG. 6 (1)). On receiving a standby response from the decoder 114 (FIG. 6 (2)), the controller 111 transmits a transfer request to the storage 113 (FIG. 6 (3)). At this point, the controller 111 receives a transfer response from the storage 113 (FIG. 6 (4)).

In response to the transfer request transmitted from controller 111, the storage 113 transfers the data designated, to the decoder 114. The decoder 114 accumulates data. When it becomes able to output stream data since the decoder 114 accumulates data, the decoder 114 notifies the controller 111 of the completion of standby (FIG. 6 (5)).

The controller 111 first adjusts the timing of outputting the stream data (FIG. 6 (6)) and then transmits a playback request to the decoder 114 (FIG. 6 (7)). The decoder 114 outputs stream data based on sync signals in frame unit.

(Playback Control)

FIG. 7 shows the playback control sequence performed in the embodiment when any failure occurs.

This sequence is performed if no data is received in synchronism in frame unit after the decoder 114 has transmitted a standby request. In this case, the decoder 114 does not receive the data it should receive in units of two-image frame time. The decoder 114 therefore transmits no-transfer notification to the controller 111 in next frame unit (FIG. 7 (1)).

Receiving no data transferred from the decoder 114, the controller 111 transmits a transfer request again to the storage 113 (FIG. 7 (2)). The controller 111 then receives a transfer request from the storage 113 (FIG. 7 (3)).

If the controller 111 achieves a control without failure, in response to the transfer request, the following process will be performed normally. The controller 111 therefore receives a standby completion signal (FIG. 7 (4)). If any errors are corrected, merely by adjusting the timing of outputting stream data, the controller 111 is not influenced after it has transmitted the playback request. Hence, the decoder 114 outputs stream data in frame unit.

The playback control sequence described above, the data transfer from the storage 113 fails. Nonetheless, once the controller 111, storage 113 and decoder 114 have received any control request, when a control signal or data comes at which frame unit is obtained. Errors can therefore be processed in minimum frame unit, or within the shortest possible wait time. Hence, data recovery can be performed in a very short time.

If the data recovery is found impossible, an error notification is generated, and the video server apparatus is switched to another system at once. The video server apparatus according to the embodiment can therefore play back programs in high quality, not influenced with the image playback process.

The controller 111 makes the interval at which to transmit data from the storage 113 to the decoder 114, shorter than the normal interval at which data should be transmitted if the embodiment is restored from the error state to the normal operating state.

FIG. 8 is a flowchart showing the control sequence performed in the decoder 114.

On receiving a playback request from the controller 111, the decoder 114 detects the vacant storage area of the buffer 1141-1 (step ST8a). It is determined whether the buffer 1141-1 can has a re-transmission buffer area based on the vacant storage area detected, i.e., vacant area large enough to hold a predetermined mount (step ST8b). If the buffer 1141-1 has the re-transmission buffer area (Yes in step ST8b), the decoder 114 transmits a re-transmission request (indicating that the transferred data has not been received) to the controller 111 (step ST8c).

If the buffer 1141-1 does not have the vacant area (No in step ST8b), the decoder 114 supplies data to an external apparatus, notifying the video server apparatus is not operating normally (step ST8d).

(Collection of Log Data)

Figure 9:
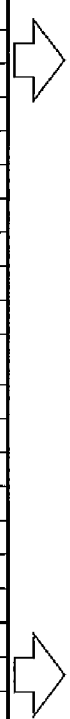
FIG. 9 is a diagram showing the log data analysis performed for various events in the embodiment.

FIG. 9 shows the log data analysis performed for various events.

In the controller 111, encoders 1121 to 112n, storages 1131 to 113m, decoders 1141 to 114p and network 115, the content data, the synchronous counter values, and the processed contents thereof are collected, as log data, in the log data managers 111-5, 1121-4, 1131-4 and 1141-4. The log data is then accumulated in the controller 111 or a processor. Using the synchronous counter values as keys, the log data items are arranged, indicating the sequence in which the events (content data items) have been processed. The log data can be used to analyze and protect the content data if errors occur in the video server apparatus.

How content data 1 (e.g., CM) is processed will be explained.

The controller 111 transmits a standby request to the decoder 114. At this point, the counter value "15" acquired in the timer 111-2 is inserted in the header of the standby request. The control 111 records, in the log data manager 111-5, the data representing the standby request in association with the counter value "15" and the data identifying the controller 111.

A standby response having a header containing the counter value "15" arrives from the decoder 114 at the controller 111. The controller 111 records, in the log data manager 111-5, the data representing the standby response in association with the content data 1, the synchronous counter value "15" and the data identifying the controller 111.

The decoder 114 transmits a notice indicating non-receipt of transferred data and containing the counter value "18" in the heater. On receiving this notice, the controller 111 records the data that represents the non-receipt of transferred data, in the log data manager 111-5, in association with the content data 1, the synchronous counter value "18" and the data identifying the controller 111.

The controller 111 then transmits a transfer request to the storage 113, and then records the data representing the transfer request, the content data 1 and the synchronous counter value "19" in the log data manager 111-5, in association with the data identifying the controller 111.

On receiving a standby request, the decoder 1141 transmits a standby response to the controller 111. At this point, the counter value "15" acquired in the timer 1141-2 is inserted in the header of the standby request. Further, the decoder 1141 records the data representing the standby response in the log data manager 1141-4, in association with the content data 1, the synchronous counter value "15" and the data identifying the decoder 1141.

As has been described above, the controller 111, encoders 1121 to 112n, storages 1131 to 113m, decoders 1141 to 114p and network 115 process data in unison, in synchronism with control units of frame unit such as e.g., 33 ms within a processing time. The controller 111, encoders 1121 to 112n, storages 1131 to 113m, decoders 1141 to 114p and network 115 can therefore detect control data requests coming from any other functions and the fluctuation of the responses coming from the other functions. Based on the response fluctuation, the errors can be reliably illuminated in the playback process.

Moreover, the controller 111 can manage the control data requests coming from the encoders 1121 to 112n, storages 1131 to 113m, decoders 1141 to 114p and network 115, and also the response fluctuation of these functions.

Further, the controller 111 can make the interval at which to transmit data from the storage 113 to the decoder 114, shorter than the normal interval at which data should be transmitted if the embodiment is restored from the error state to the normal operating state.

Still further, even if the encoders 1121 to 112n, storages 1131 to 113m, decoders 1141 to 114p and network 115 fail to operate in synchronism, controller 111 determines whether the data can be recovered based on the synchronization error. If the data can be recovered by playback, the following image frames are automatically recovered. Hence, the data can be fast restored before the maintenance personnel start working.

If the data cannot be recovered by playback, the video server apparatus informs the user or maintenance personnel of this fact. The user or maintenance personnel can therefore quickly repair the apparatus, making it operate well.

Moreover, if the video server apparatus has any failure, the log data is analyzed, finding how the controller 111, encoders 1121 to 112n, storages 1131 to 113m, decoders 1141 to 114p and network 115 have processed data in frame unit. Thus, the failure can be analyzed from the operating time chart.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A video server apparatus comprising:
   a memory comprising a first timer, the memory configured to record content data based on a first time measured by the first timer;

a recorder comprising a second timer, the recorder configured to record the content data in the memory based on a second time measured by the second timer;
a decoder comprising a third timer, the decoder configured to play the content data recorded in the recorder based on a third time measured by the third timer;
a controller configured to control processes performed in the memory, the recorder, and the decoder;
a synchronizer configured to generate sync signals in a frame unit; and
a sync signal transmitter configured to distribute the sync signals generated by the synchronizer in the frame unit to the memory, the recorder, the decoder, and the controller,
wherein the memory comprises a memory time manager, the recorder comprises a recorder time manager, the decoder comprises a decoder time manager, and the controller comprises a controller time manager,
wherein the memory time manager, the recorder time manager, the decoder time manager, and the controller time manager are configured to manage the sync signals received from the sync signal transmitter and adjust the first time measured by the first timer, the second time measured by the second timer, and the third time measured by the third timer to the sync signal,
wherein the controller comprises a controller decision function, the memory comprises a memory decision function, and the decoder comprises a decoder decision function, and
wherein the controller decision function, the memory decision function, and the decoder decision function are configured to determine whether the controller, the memory, and the decoder are synchronized with one another while the controller, the memory, and the decoder are adjusted to synchronize, and if a synchronization error exists, the controller decision function, the memory decision function, or the decoder decision function determines a condition whether data can be recovered in a playback process based on the synchronization error.

2. The video server apparatus of claim 1, wherein the memory time manager, the recorder time manager, and decoder time manager are configured to transfer sync signal data to the controller in the frame unit either in response to an inquiry from the controller or periodically.

3. The video server apparatus of claim 1, wherein the controller is configured to associate the sync signal data with data managed by the controller.

4. The video server apparatus of claim 3, wherein the controller determines an interval at which to transmit data from the memory to the decoder, the interval being shorter than a normal interval at which data is transmitted if the apparatus is restored from an error state to a normal operating state.

5. The video server apparatus of claim 1, wherein the controller decision function, the memory decision function, or the decoder decision function uses at least one of the synchronization error and a vacant storage area of a buffer as the condition.

6. The video server apparatus of claim 1, wherein the controller comprises a controller recovery function, the memory comprises a memory recovery function, and the decoder comprises a decoder recovery function, and
wherein the controller recovery function, the memory recovery function, and the decoder recovery function are configured to recover a frame of content data if the controller decision function, the memory decision function, or the decoder decision function determines that an immediately preceding frame of the content data cannot be recovered.

7. The video server apparatus of claim 1, wherein the controller comprises a controller failure manager, the memory comprises a memory failure manager, and the decoder comprises a decoder failure manager, and
wherein the controller failure manager, the memory failure manager, and decoder failure manager are configured to manage a failure and notify an external apparatus of the failure if the controller decision function, the memory decision function, or the decoder decision function determines that the content data cannot be recovered by playback.

8. The video server apparatus of claim 1, wherein the memory comprises a memory log manager, the recorder comprises a recorder log manager, the decoder comprises a decoder log manager, and the controller comprises a controller log manager, and
wherein the memory log manager, the recorder log manager, the decoder log manager, and the controller log manager are configured to manage a control performed on the data in the frame unit as log data for an event.

9. The video server apparatus of claim 1, wherein the sync signal transmitter is provided in the controller, the controller is configured to receive the sync signals generated in the synchronizer and distribute the sync signals to the memory, the recorder, and the decoder.

10. The video server apparatus of claim 1, wherein the sync signal transmitter is provided in the synchronizer.

11. The video server apparatus of claim 1, further comprising a network comprising an asynchronous bus and configured to switch input channels connecting the memory and output channels connecting the decoder.

* * * * *